(12) United States Patent
Boyden

(10) Patent No.: US 9,066,495 B2
(45) Date of Patent: Jun. 30, 2015

(54) FOOD AND/OR WATER DELIVERING, RECEIVING, AND FEEDING APPARATUS

(76) Inventor: Andrew Boyden, Fort Wayne, IN (US)

(*) Notice: Subject to any disclaimer, the term of this patent is extended or adjusted under 35 U.S.C. 154(b) by 0 days.

(21) Appl. No.: 12/788,106

(22) Filed: May 26, 2010

(65) Prior Publication Data

US 2013/0233247 A1 Sep. 12, 2013

(51) Int. Cl.
*A01K 61/02* (2006.01)
*A01K 5/01* (2006.01)
*A01K 7/00* (2006.01)

(52) U.S. Cl.
CPC .............. *A01K 5/0114* (2013.01); *A01K 7/00* (2013.01)

(58) Field of Classification Search
CPC ......... A01K 5/0114; A01K 7/00; A01K 7/02; A01K 5/0225
USPC .......... 119/51.01, 51.5, 52.1, 53, 61.5, 61.56, 119/72, 72.5; D30/121, 132, 133
See application file for complete search history.

(56) References Cited

U.S. PATENT DOCUMENTS

| | | | |
|---|---|---|---|
| 5,081,957 A | | 1/1992 | Warner, Jr. |
| 5,738,039 A | * | 4/1998 | Berman et al. ................... 119/77 |
| 5,960,742 A | * | 10/1999 | O'Rourke et al. .............. 119/74 |
| 7,367,157 B1 | * | 5/2008 | Doan ............................. 47/40.5 |
| 2008/0190374 A1 | * | 8/2008 | Farris ............................... 119/74 |
| 2010/0064976 A1 | * | 3/2010 | Keller et al. .................... 119/72 |

* cited by examiner

*Primary Examiner* — Richard Price, Jr.

(57) ABSTRACT

A food and/or water delivery and receiving device especially suited for pets including a receiving dish, an elongated delivery tube, and a handle, where the food and water delivery tube is generally disposed vertically relative to the ground and is fluidly connected to the dish at a first end and open to receive food and/or water at a second end, and where the delivery tube further includes an ergonomic handle extending generally perpendicularly from a point near the second end of the delivery tube and where the open second end of the delivery tube is further configured to hold a bottle or other conveying device for liquid or food.

13 Claims, 7 Drawing Sheets

FOOD AND/OR WATER DELIVERING, RECEIVING, AND FEEDING APPARATUS

CROSS-REFERENCES TO RELATED APPLICATIONS

None

STATEMENT REGARDING FEDERALLY SPONSORED RESEARCH OR DEVELOPMENT

None

BACKGROUND

1. Field of the Application

The field of the present patent application relates to the pet feeding and watering devices.

2. Description of the Prior Art

Food and liquid receptacles, commonly dishes, designed to contain food and drink for ready consumption by humans and/or animals are well known. In particular, there are many well known designs for dishes to be used with or on behalf of domesticated animals, such as reptiles, rodents, cats, dogs, and the like. Other designs are used for nondomesticated but captive animals such as those that one might find in a zoo or circus.

Most such dishes are very simple temporary containers having a generally circular shape when viewed from above and a generally concave interior suitable to retain food or liquid. Most often the dish is sized for convenient use at a specific location, such as one's home, or with a specific animal. For example, larger dishes are often used for larger animals.

When using such a prior art design of dish, a user conveys food or water from a remote location, like a bag of food or a water faucet, to the dish whenever necessary. Moreover, the only convenient way of changing the location of such prior art dishes is for someone to bend over pick up the dish and transfer it to another location.

More recent designs of pet dishes try to address the limitations of older designs by adding means for filling the dish somewhat remotely. For example, U.S. Pat. No. 5,081,957 to Louis E. Warner, Jr. (the "'957 patent") discloses a pet feeding and watering dish having an attachable hose. However the '957 patent does not disclose a semi-permanent supply tube suitable to hold a bottle of water. Moreover, the '957 patent and other prior art references do not disclose a collapsible system.

Thus, the prior art fails to disclose, teach or suggest a means of remote filling of a pet dish especially in combination with a convenient transport of the same. Moreover, the prior art fails to disclose, teach, or suggest a device that allows for convenient filling of a pet dish by insertion of a bottle that the device will then hold allowing a user to walk away from the device. What is needed, therefore, is a design for a food or liquid receiving and feeding apparatus that provides a means for remote unattended filling of the dish and a means of easy transfer of the dish from one location to another.

SUMMARY OF THE INVENTION

The present invention provides a design for a food and/or water delivering, containing and feeding apparatus especially suited for use with animals, comprising a receiving dish, an elongated delivery tube, a handle, and a hook, where the food and water delivery tube is generally disposed vertically relative to the ground and is fluidly connected to the dish at a first end and open to receive food and/or water at a second end, and where the delivery tube further comprises an ergonomic handle extending generally perpendicularly from a point near the second end of the delivery tube and where the open second end of the delivery tube further comprises means for holding bottle or other conveying device for liquid or food.

Other embodiments of the present invention, allow for convenient storage or packaging of an apparatus made in accordance with the claims of the present invention.

It will be understood by those of skill in this art that other objects of the present invention may be achieved within the scope of the disclosure and claims below.

DETAILED DESCRIPTION OF THE EMBODIMENTS

Figure 1:
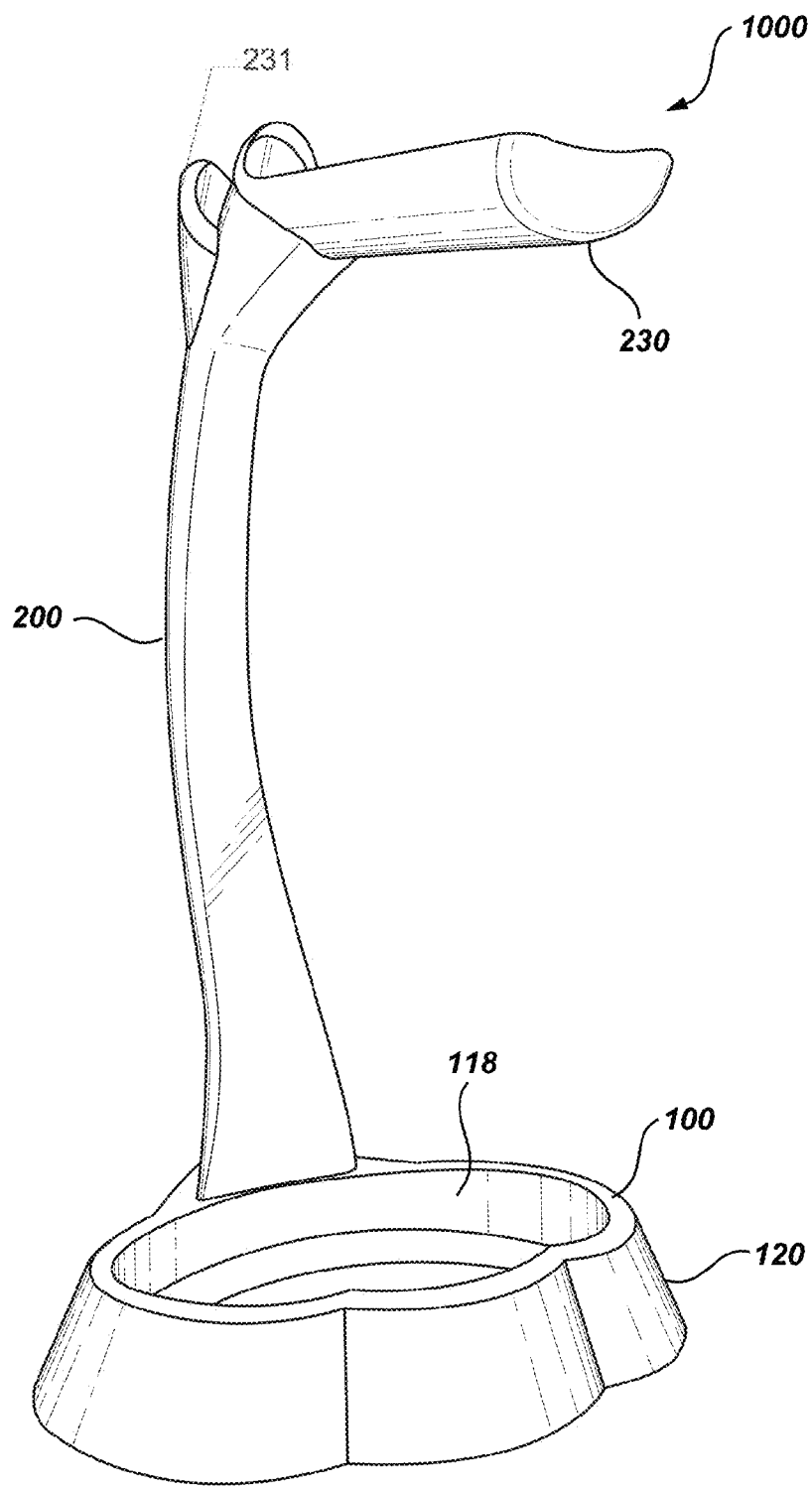
FIG. 1 is an oblique view of a food or liquid delivery and containing apparatus according to an embodiment of the present invention.

Referring first to FIG. 1, there is shown an oblique view of a food or liquid delivery and containing apparatus 1000 according to the present invention. Liquid delivery apparatus 1000 comprises dish shaped receptacle 100 having concave inner surface 110 and exterior surface 120. In the preferred embodiment, liquid delivery apparatus 1000 is plastic, but those of skill in the art will appreciated that any light weight, corrosive resistant material is suitable for the present invention.

Continuing to refer to FIG. 1, there is shown delivery tube 200 connected to the outer surface 120 of receptacle 100. Delivery tube is 200 is cannulated from top to bottom, and its hollow interior is in fluid communication with receptacle 100 via outlet opening 220. Delivery tube 200 is preferably curved as shown in FIG. 1 such that the top of delivery tube 200 is generally above concave surface 110 of receptacle 100. Handle 230 extends generally perpendicularly from the top of delivery tube 200, and it located at a height that allows an adult user of the present invention to move the device 1000 without bending over.

As further illustrated in FIG. 1, handle 230 includes hook 231. Hook 231 is useful for holding a pet leash, pet clothing, or other desired items in a convenient, but movable, location.

Figure 2:
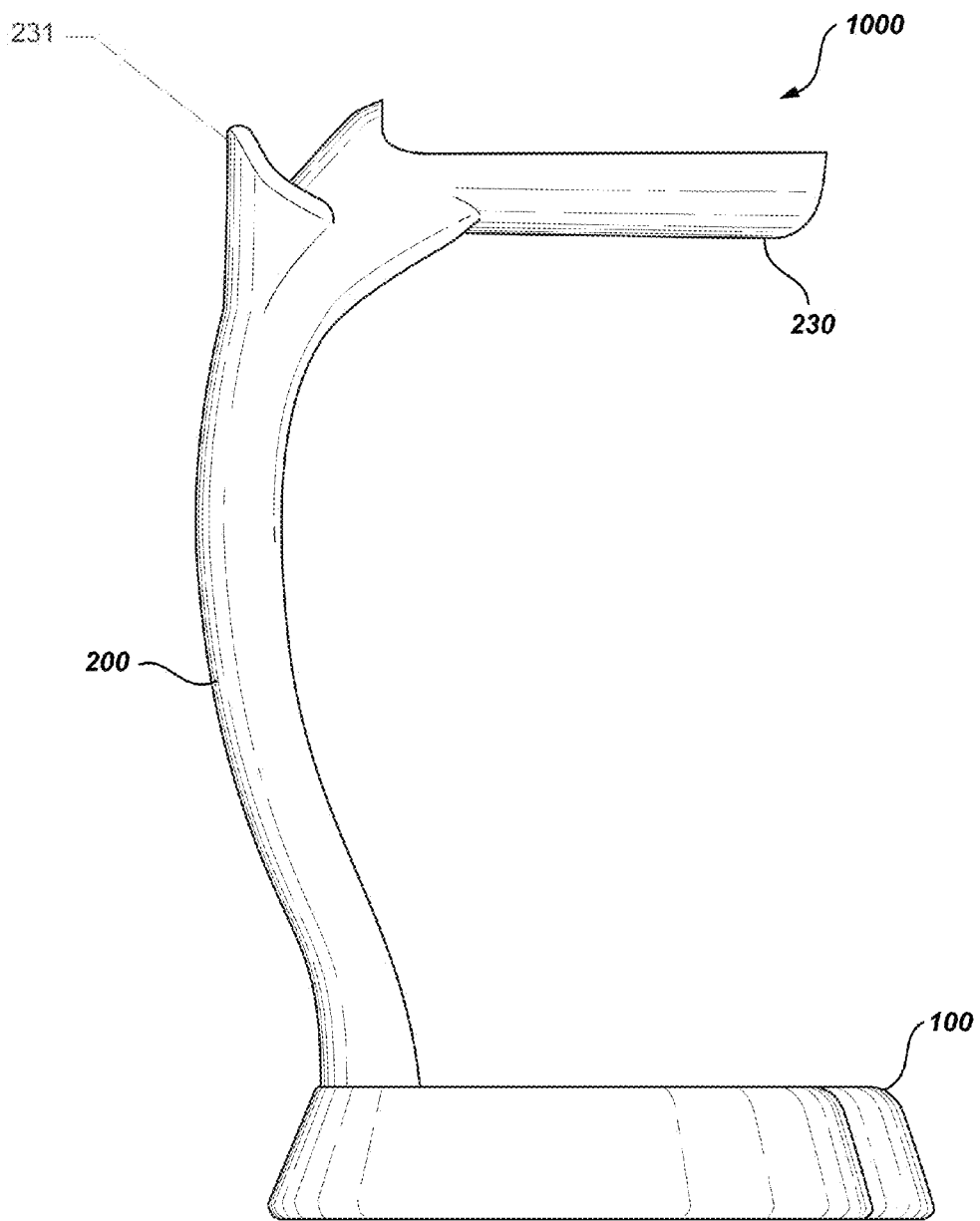
FIG. 2 is a side elevation view of a food or liquid delivery and containing apparatus according to an embodiment of the present invention.
Figure 3:
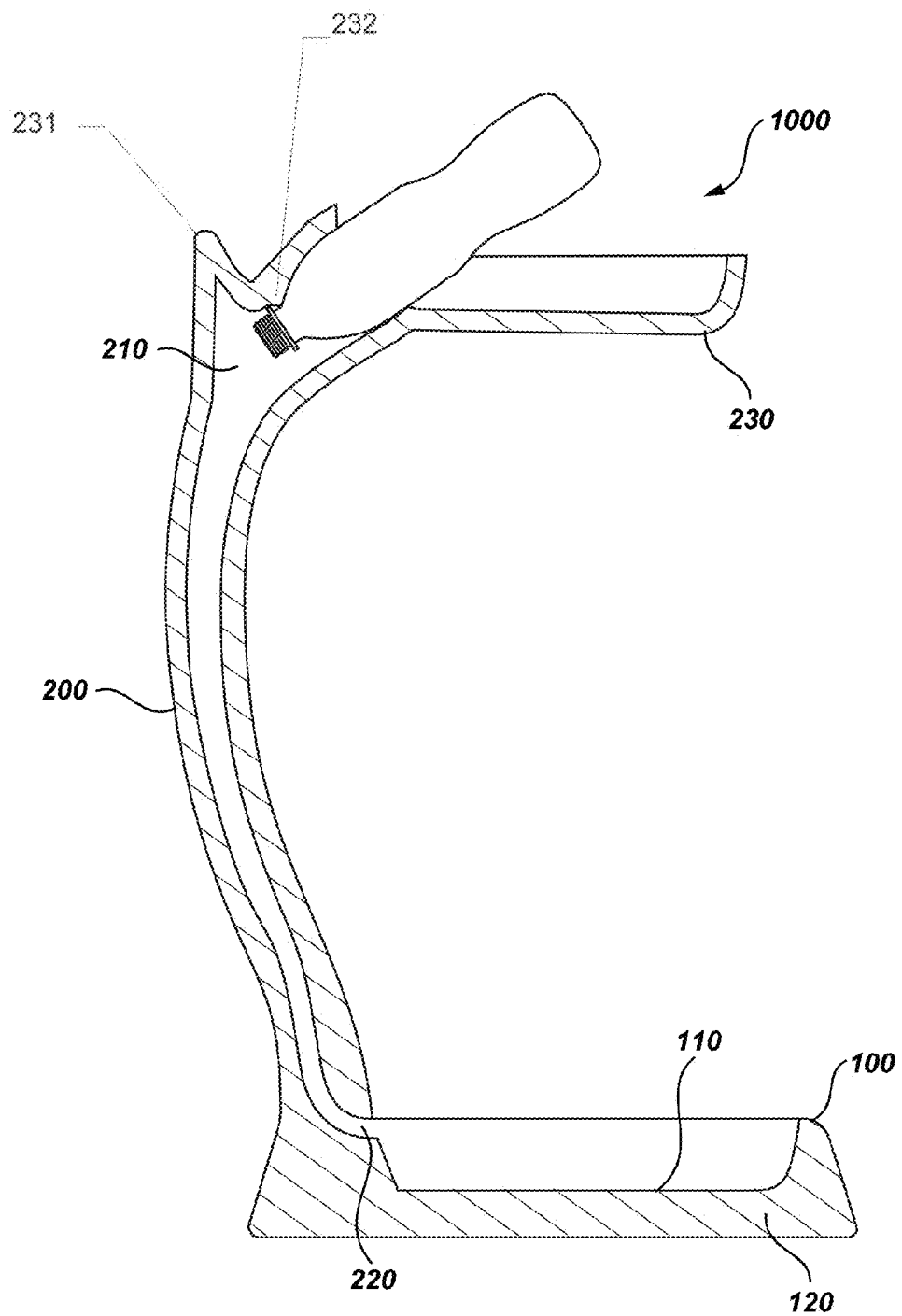
FIG. 3 is a side cross-sectional view of a food or liquid delivery and containing apparatus according to an embodiment of the present invention.

Referring to FIGS. 1, 2, and 3, there is also shown the top of delivery tube 200 which comprises inlet opening 210 and perpendicular handle 230. Those of skill in the art will appreciate that the present design is suitable for use with solids such as dry pet food or liquids such as water. For example, a user can supply water through delivery tube 200 via inlet opening 210 such that the water flows through delivery tube 200 and out outlet opening 220 into the concave surface 110 of receptacle 100.

Inlet opening 210 further comprises a tab, lip or other suitable means for holding a standard shaped water bottle in place as shown in FIG. 3, so that a user can insert the bottle and walk away.

Moreover, receptacle 100 is counterweighted such that delivery device 1000 does not tip from the moment produced by the combination of handle 230 and delivery tube 200, especially when a water bottle is inserted into opening inlet opening 210.

Referring now to FIG. 3, in one preferred embodiment inlet opening 210 of delivery tube 200 is sized and shaped such that it can receive and hold a standard 12 ounce bottle of water. As further shown in FIG. 3, tab 232 fits beneath the rim of a threaded water bottle top to hold the bottle in place. Thus, a user can insert a bottle of liquid move apparatus 1000 to a desired location and otherwise leave the apparatus unattended to feed or water a pet.

Referring still to FIG. 3, there is further shown handle 230 extending generally perpendicularly from the top of delivery tube 200. It will be appreciated by those of skill in the art, that handle 230 may be of any convenient ergonomic shape. Handle 230 is can be grasped by a user of apparatus 1000 to move apparatus 1000 to a desired location for use in feeding or watering a pet.

Figure 4:
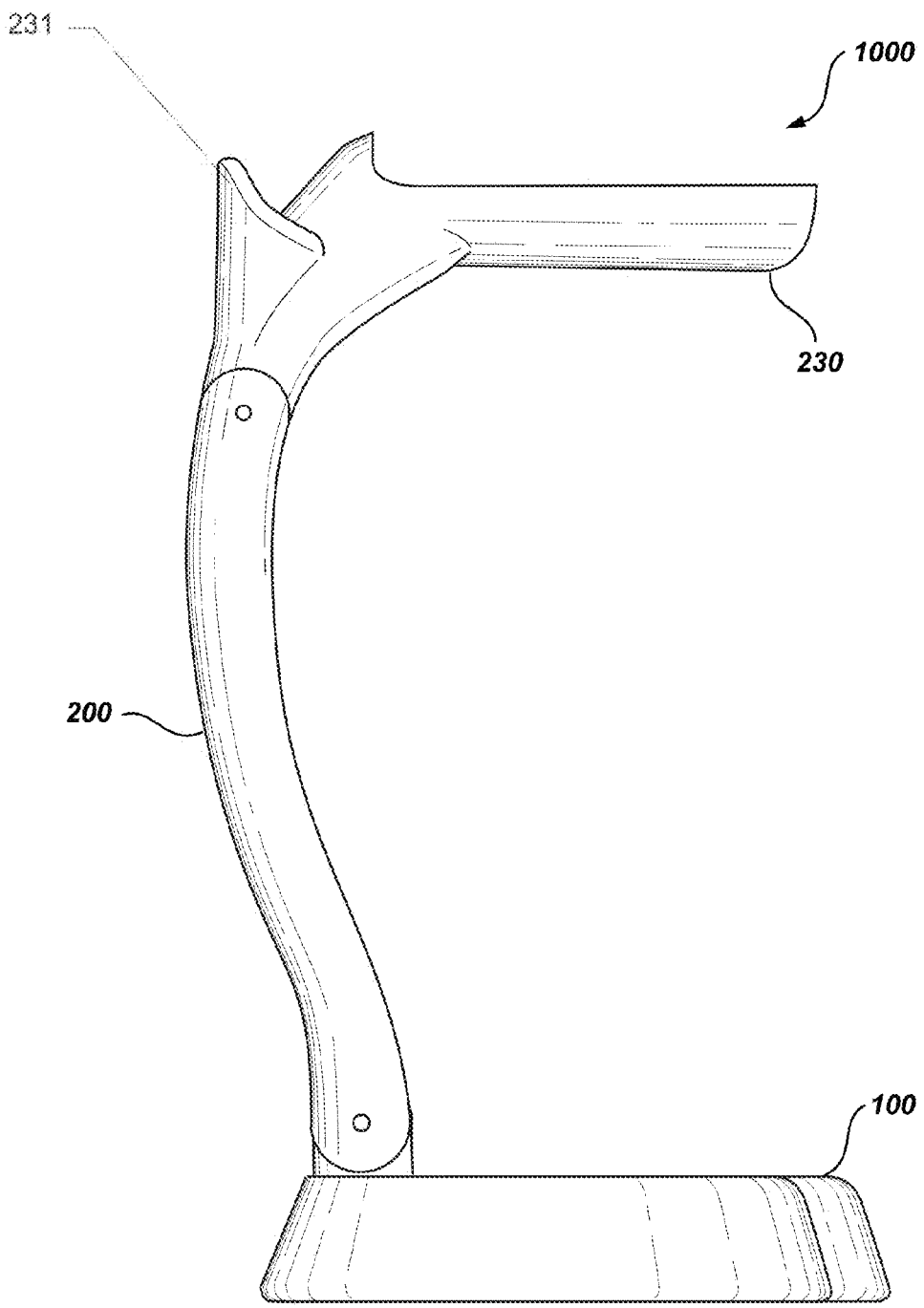
FIG. 4 is a side view of a food or liquid delivery and containing apparatus according to an alternative embodiment of the present invention.

A first alternative embodiment of the present invention is shown in FIG. 4, where tube 200 is hingedly attached to receptacle 100, and handle 230 is hingedly attached to delivery tube 200, preferably with a detent or tab to hold each piece in place upon reaching a desired orientation.

Figure 6:
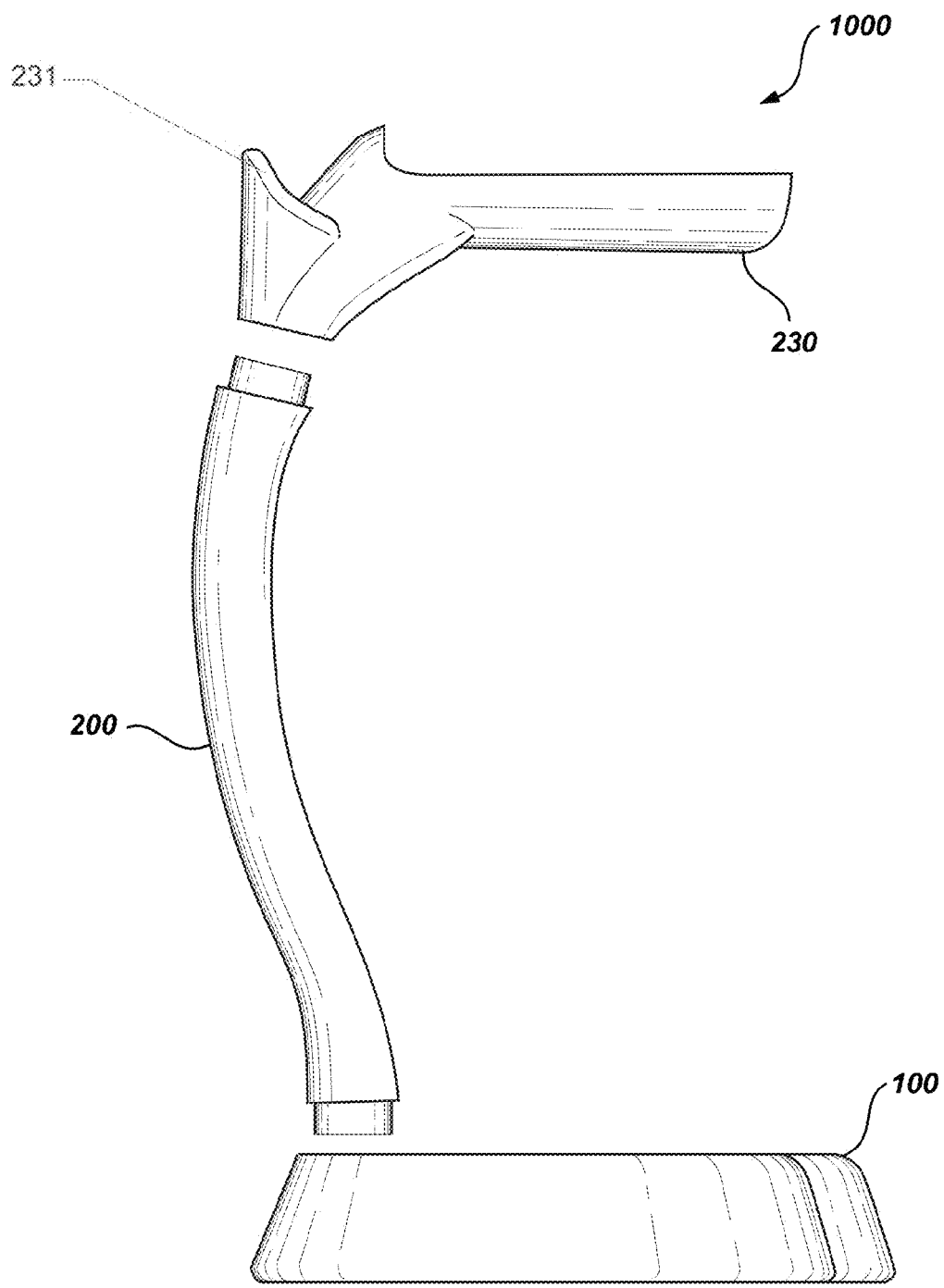
FIG. 6 is a side view of a food or liquid delivery and containing apparatus according to another alternative embodiment of the present invention.

A second alternative embodiment of the present invention is illustrated in FIG. 6, where tube 220 is removably attached to receptacle 100, and handle 230 is removably attached to delivery tube 200.

Figure 5:
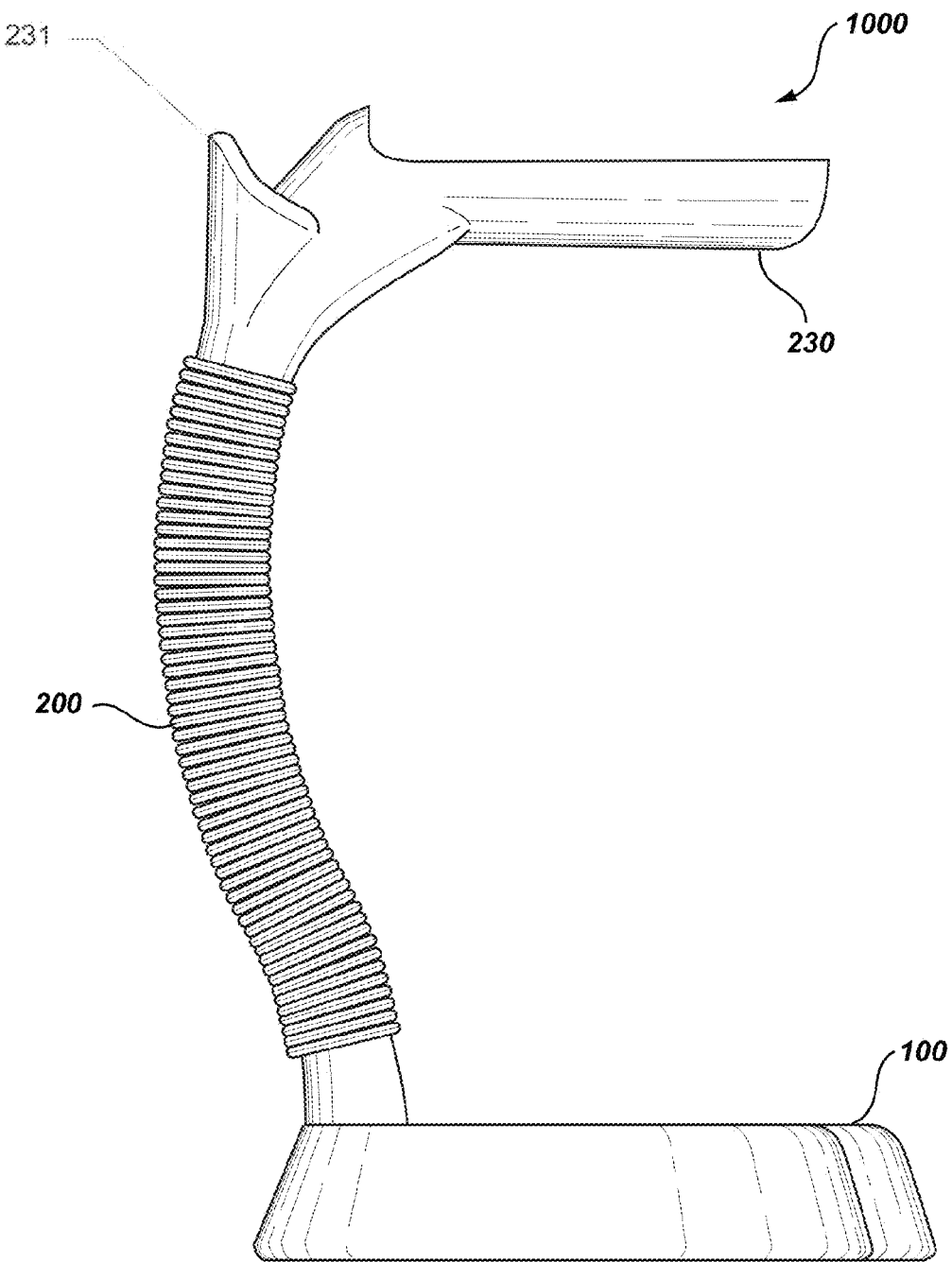
FIG. 5 is a side view of a food or liquid delivery and containing apparatus according to another alternative embodiment of the present invention.

Referring now to FIG. 5, there is shown a third alternative embodiment of the present invention wherein delivery tube 200 is selectively collapsible such that the height of the device can be varied as desired.

Figure 7:
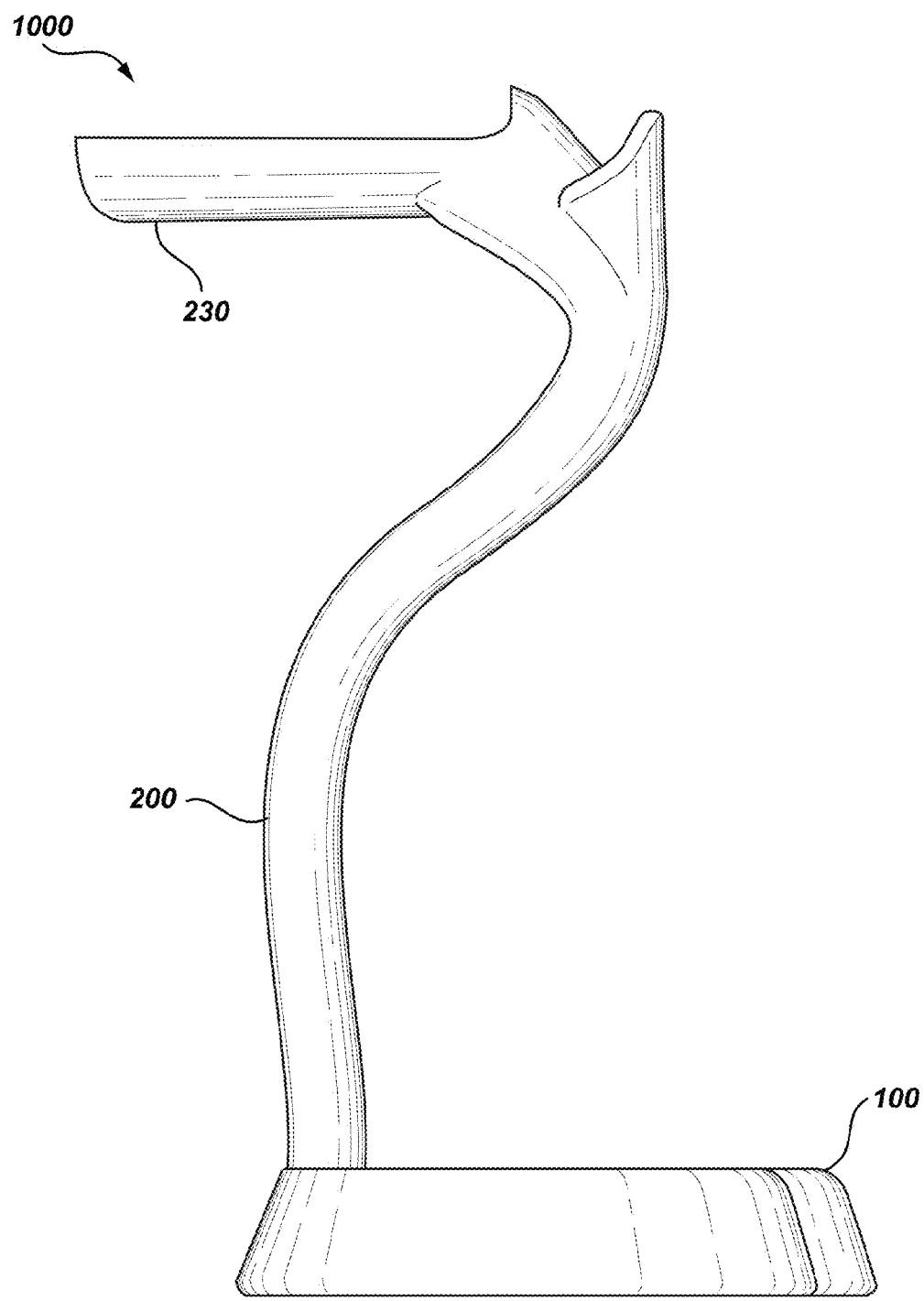
FIG. 7 is a side view of a food or liquid delivery and containing apparatus according to another alternative embodiment of the present invention.

Referring to FIG. 7, there is shown yet another alternative embodiment of the present invention wherein handle 230 extends perpendicularly from delivery tube 200 in a direction opposite receptacle 100.

It should be understood that the above described device can be used for a variety of liquids or food items.

The many alternative embodiments of the present invention enhance the ability of user to store apparatus 1000 while retaining the functionality of moving apparatus 1000 to a desired location in, for example, one's home and the functionality of placing a bottle in inlet opening 210 for delivery of water to receptacle 100 of apparatus 1000.

It should be understood that the above descriptions are of preferred embodiments and included for illustrative purposes only, and it is not meant to be limiting of the invention. A person skilled in the art will understand that variations of this invention are included within the scope of the claims.

What is claimed is:

1. A food and liquid delivery and containing apparatus, comprising: a receptacle with a substantially flat bottom surface, an elongated delivery tube, and a handle portion; said handle portion is configured to support the weight of said apparatus when said handle is used to lift said apparatus; the elongated delivery tube having a lower first end, an upper second end, and a middle portion generally vertically separating said lower first end from said upper second end, where the lower first end of the delivery tube is connected to the receptacle and the upper second end of the delivery tube comprises said handle portion, said handle portion further comprises an upper half surface and a lower half surface, said upper half surface comprises an opening adapted to receive food or liquid, said opening provides fluid communication between the exterior of said delivery tube and the lower first end of said delivery tube, and said handle portion is substantially parallel to the bottom surface of said receptacle, wherein the apparatus is freely standing.

2. The food and liquid delivery and containing apparatus of claim 1, wherein the receptacle is dish shaped.

3. The food and liquid delivery and containing apparatus of claim 1, wherein the apparatus is constructed of plastic.

4. The food and liquid delivery and containing apparatus of claim 1, wherein said opening further comprises an inlet opening adapted to hold a water bottle in place.

5. The food and liquid delivery and containing, apparatus of claim 1, wherein the delivery tube is curved.

6. The food and liquid delivery and containing apparatus of claim 1, wherein the handle portion extends toward and substantially transversely to a vertical plane through the edge of the receptacle opposite the connection between said first end of the delivery tube and said receptacle.

7. The food and liquid delivery and containing apparatus of claim 1, wherein the deliver tube curves such that the upper second end of the delivery tube is vertically higher than the uppermost portion of said receptacle, and the handle portion extends substantially transversely to and away from a vertical plane through the edge of the receptacle opposite the connection between said first end of the delivery tube and said receptacle.

8. The food and liquid delivery and containing apparatus of claim 1, wherein the delivery tube is removably connected to the receptacle.

9. The food and liquid delivery and containing apparatus of claim 1, wherein the delivery tube is hingedly connected to the receptacle.

10. The food and liquid delivery and containing apparatus of claim 1, wherein the handle is removably connected to the delivery tube.

11. The food and liquid delivery and containing apparatus of claim 1, wherein the handle is hingedly connected to the receptacle.

12. The food and liquid delivery and containing apparatus of claim 1, wherein the delivery tube is collapsible.

13. The food and liquid delivery and containing apparatus of claim 1, wherein said upper second end of said delivery tube further comprises a hook exttending opposite the handle portion.

* * * * *